United States Patent [19]

Berner et al.

[11] Patent Number: 4,595,320

[45] Date of Patent: Jun. 17, 1986

[54] BORING TOOL WITH A DOUBLE CUTTER HEAD, IN WHICH THE WORKING LOAD IS PREVENTED OUTSIDE THE ELASTIC RANGE OF THE CUTTING BIT HOLDER MATERIAL IN THE VICINITY OF THE OUTERMOST RADIAL POSITIONING

[75] Inventors: Willy Berner; Hans Berger; Kurt Boller, all of Rupperswil, Switzerland

[73] Assignee: Urma AG, Rupperswil, Switzerland

[21] Appl. No.: 652,744

[22] Filed: Sep. 19, 1984

[30] Foreign Application Priority Data

Sep. 20, 1983 [CH] Switzerland .................... 5084/83

[51] Int. Cl.⁴ .................. B23B 51/00; B23B 29/26
[52] U.S. Cl. ................................. 408/182; 408/197;
            408/713; 407/37; 407/45
[58] Field of Search ............ 408/182, 187, 188, 197,
            408/713; 279/83; 407/37, 45

[56] References Cited

U.S. PATENT DOCUMENTS

| | | | |
|---|---|---|---|
| 2,021,349 | 11/1935 | Berg | 408/182 X |
| 4,006,995 | 2/1977 | Gruner | 408/197 X |
| 4,043,697 | 8/1977 | Eckle | 408/182 |
| 4,242,018 | 12/1980 | Schürfeld | 408/182 |

*Primary Examiner*—Fred Silverberg
*Attorney, Agent, or Firm*—Walter C. Farley

[57] ABSTRACT

The head of this boring tool carries two bit holders, which can be radially adjusted to different cutting widths by tooth systems provided on sloping faces of the head and/or bit holder. To ensure that there is still reciprocal supporting of the bit holders even in the outermost adjustment range thereof, cams are provided for extending the supporting surfaces. As an alternative to or in addition to this measure, the spacing between the front end face of the head and the surface of the bit holder parallel thereto is made so small that when high cutting forces occur these surfaces are supported on one another before the elastic deformation range of the bit holders is exceeded.

6 Claims, 5 Drawing Figures

BORING TOOL WITH A DOUBLE CUTTER HEAD, IN WHICH THE WORKING LOAD IS PREVENTED OUTSIDE THE ELASTIC RANGE OF THE CUTTING BIT HOLDER MATERIAL IN THE VICINITY OF THE OUTERMOST RADIAL POSITIONING

The invention is in the field of metal-removing machine tools and relates to a boring tool according to the preamble of claim 1.

BACKGROUND OF THE INVENTION

In a known double cutter boring tool, the head part 1 carries two cutting bit holders 2 and 3, which in turn carry interchangeable bits. The head end of the boring tool, which is trapezoidal in the lateral view of FIG. 3, has a linear tooth system on the sloping lateral faces 6, 6a along which the bit holders 2, 3 provided with an identical tooth system can be moved in such a way that the cutting edges of the bits can be adjusted radial in a direction towards and away from the turning centre. The bore diameter is set in this way. By means of a working adjustment range measured from the turning centre, there is a reciprocal supporting of the two bit holders in such a way that even very high cutting forces do not lead to inelastic permanent deformation of the bit holders, or even to the splitting thereof, i.e. to their fracture. If the adjustment range is so large that it is outside the reciprocal support of the bit holders, i.e. in ranges where the material cross-section of the bit holder absorbs the cutting forces and the much lower feed forces via the tooth systems on the head part 1, such undesired occurrences can be encountered.

In order to be able to obtain a desired minimum boring diameter in the case of completely slid together cutting bit holders, at the maximum the support faces 8, 8a assume the displacement length of the minimum radius, i.e. the distance from the turning centre to the circumference. Beyond this radial adjustment path, there is no longer any reciprocal supporting of the bit holders. In this adjustment range, there must no longer be a maximum loading of the tool, which directly influences the metal removal rate and consequently the profitability.

SUMMARY OF THE INVENTION

An object of the invention is, on the basis of the known boring tool, to provide a double cutter boring tool which, in the case of the same dimensioning is able to absorb an equally high cutting load without plastic deformation of the bit holders over an increased, radial boring diameter adjustment range and in the case of the same dimensioning.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
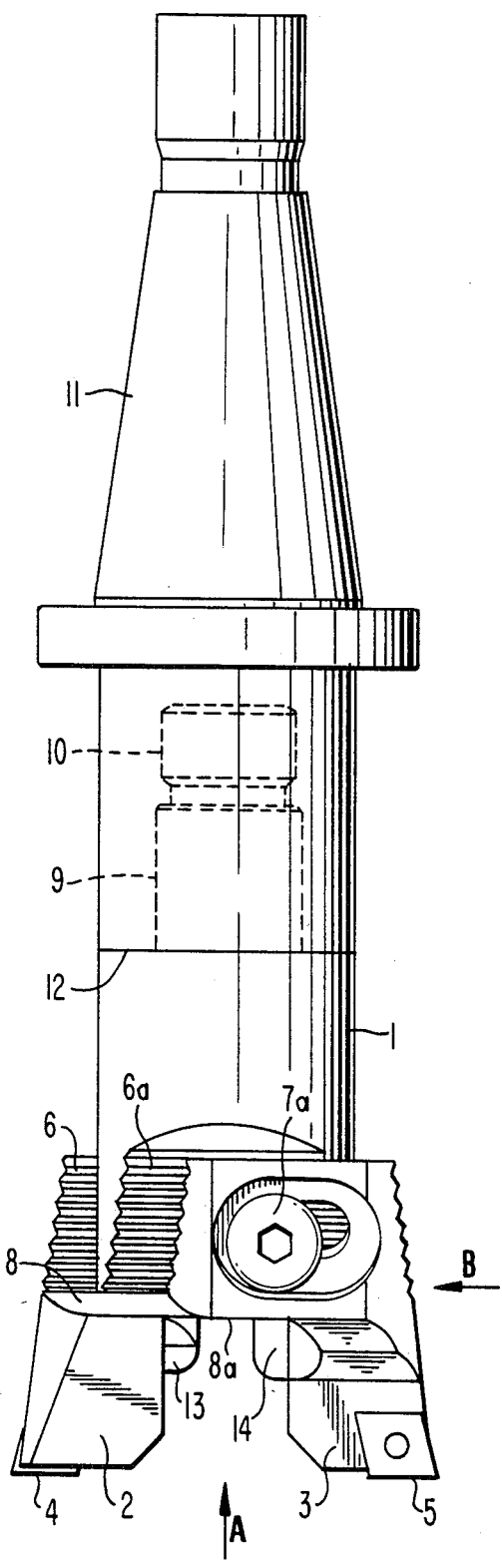
FIG. 1 a view of the tool set to the maximum diameter range and fitted on an adapter for connection to a machine.
Figure 2:
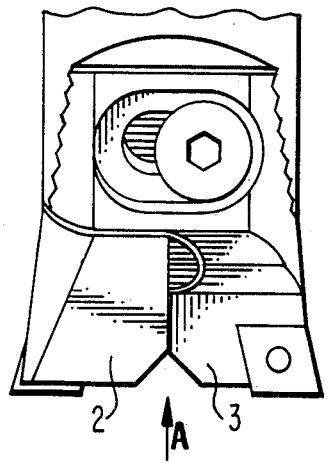
FIG. 2 a partial view of the tool according to FIG. 1, set to the smallest diameter.

According to FIG. 1, the boring tool 1 has a head 1 and located thereon on either side cutting bit holders 2, 3, which are functionally linked with one another and on which are interchangeably arranged the cutting bits 4, 5. For connection to a machine tool, use is preferably made of an adaptor 11, in which the boring tool head 1 is placed by means of a cylindrical journal 9 placed on the other, non-cutting end and a threaded journal 10 mounted thereon. The other end of head 1 facing the cutting edges has a trapezoidal construction, the trapezoidal surfaces 6, 6a inclinded towards the head axis being provided with a transversely directed, linear tooth system. This trapezoidal construction of the head part acts, in a usable approximation, in the manner of a bending carrier or support (which is theoretically derived from a parabolic profile). In conjunction with the identically toothed bit holders 2 and 3, this gives the tool optimum rigidity when it is subjected to loading. The two bit holders can be moved inwards or outwards along the linear tooth system and can be fixed in the desired position by means of screws 7, 7a.

The tooth system between the bit holders 2, 3 and head part 1 brings about an adequate non-positive connection between the tool parts. The approximately Z-shaped bit holders 2, 3 in the lateral view of FIG. 3 have an identical shape. There is a linear tooth system on surfaces 6, 6a, a supporting surface 16 on the Z-shaped connecting member and a cutting bit 4, 5. Turned and positioned in such a way that the tooth system of two identical bit holders is arranged in facing manner and the bit mounting points in the correct direction, the two Z-connecting members can be telescoped with one another in such a way that surface 8 of one and surface 8a of the other bit holder reciprocally support one another. In this position, they are fixed by the transverse tooth system to the trapezoidal head part.

Figure 5:
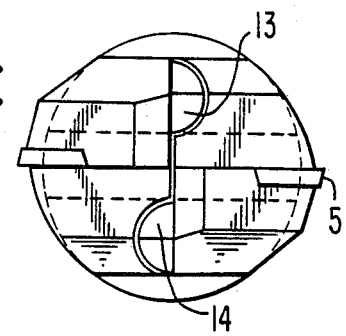
FIG. 5 a front view of FIG. 2, seen from direction A.

In a first embodiment according to the invention, support surface 8 or 8a of each of the identically shaped bit holders when slid together to the radial position at which the boring diameter, e.g. holder 2, extends beyond the turning centre, i.e. undercuts the same into the area of the other bit holder 3, which is turned by 180° with respect thereto in the form of a type of cam, bracket or extension 13. On the same bit holder a recess is provided for bracket 14 of holder 3, in which each of these protruding shoulders can be placed during the sliding together, without impeding positioning. This necessitates the topological section shown in FIG. 5 and which is much like an S-shape. Whilst maintaining the optimum stability of a bit holder, this section is such that there is no drop below a minimum cross-section on the linear tooth system and the Z-shaped web of the approximately Z-shaped bit holder 2 or 3 linking the bit side. Manufacturing advantages as well as operational advantages result from the same shape for all the bit holders, accompanied by the logical application of complex symmetry considerations, in such a way that a shape is obtained which absorbs to a maximum the symmetrically acting cutting forces and permits a reciprocal interlinking of the topography. Quite apart from this, in the case of damage only one and not a pair of bit holders have to be replaced. This is also the case with the known boring tool, but this is no longer obvious in the case of the spatially complicated construction of the bit holder according to the invention. The advantages of the known bit holder are all retained in the construction according to the invention.

Figure 3:
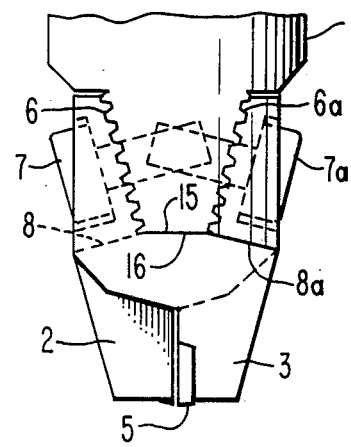
FIG. 3 a partial view of FIG. 1, seen from direction B.
Figure 4:
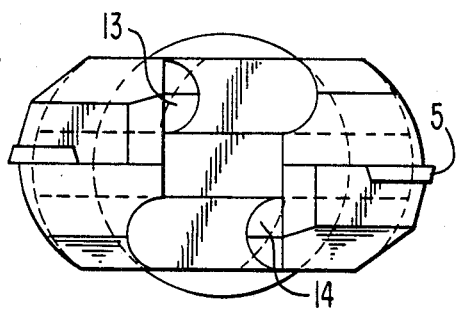
FIG. 4 a front view of FIG. 1, seen from direction A.

According to a second embodiment of the invention, for solving the set problem, a support is arranged between the bit holders 2, 3 and the end face of the head part end roughly in the form of a bending support and having the linear tooth system of the tool head 1. The support is on the surface of the Z-shaped web of a cutting bit adjacent to the reciprocal supporting surfaces 8, 8a. With respect to the linear tooth system on the bit holder, surface 6 is spaced in such a way that on engaging with the identical tooth system on head part 1 engages under load with minimum spacing and up to slight pretension with surface 15, or is permanently engaged therewith under slight pretension. FIG. 3 shows the surfaces 15 and 16 in the form of planar surfaces. This is not necessarily the case for absorbing nonorthogonal force components to the loaded plane and cylindrically bent surfaces, those with a web and counter-slot, or quite different topographies can be used. The limits are usually placed by manufacturing costs and not by manufacturing possibilities.

In the case of the third embodiment, on the same bit holder, there are two measures, a topographical section for construction of the brackets 13, 14 undercutting the turning centre and the engagement of a joint bearing surface 16 of the Z-shaped web on the end part 15 of the bending carrier. These two surfaces are adjacent to one another in maximum length, i.e. they are interconnected in one piece over this length. In this case, during the engagement between the two surfaces 15 and 16, pretension must not be excessive, because if this were the case, the loading threshold where the interlinked surfaces 8 and 8a come into effect could be in an undesired range. Therefore, the minimum spacing up to slight pretension is required and in all operating cases this leads to the desired behaviour of the tool.

What is claimed is:

1. A cutter head assembly comprising
a cutter head having a central axis about which said head is rotated during use;
first and second toothed surfaces on said head facing outwardly away from each other and from said axis, each said toothed surface carrying a linear tooth system in which each tooth lies in a separate plane which is generally perpendicular to said central axis;
first and second bit holders each having a first portion with a linear tooth system slidably engaging said teeth on one of said outwardly facing surfaces so that each bit holder is radially adjustable to a plurality of positions relative to said central axis for adjusting the cutting diameter of said assembly and so that a portion of said head is between said bit holders;
on each of said bit holders including a second portion having means for holding a cutting bit and a third, intermediate portion extending through the central axis between and transversely to said first and second portions to form a generally Z-shaped body;
means for clamping each said bit holder to its associated outwardly facing surface in any one of said plurality of radial positions;
means on said first portion of each of said bit holders defining a first contact surface on one side of said central axis facing toward the other bit holder; and means on said second portion of each bit holder on the other side of said central axis from said first contact surface defining a second contact surface facing said first contact surface on the other bit holder, each said first surface on one bit holder and said second surface on the other bit holder being at least partially overlapping and facing each other over substantially the entire range of radial adjustments of said bit holders.

2. An assembly according to claim 1 wherein each said bit holder includes a projection extending toward the other of said bit holders, said first contact surface extending onto said projection; and
each said bit holder includes a recess for receiving said projection on the other bit holder when said bit holders are adjusted to their smallest diameter positions.

3. An assembly according to claim 1 wherein said toothed surfaces on said cutter head lie in planes intersecting at an acute angle, said toothed surfaces terminating at a distal end surface of said cutter head;
and wherein each of said bit holders includes a third contact surface on said third portion in adjacent relationship with said distal end surface.

4. An assembly according to claim 3 wherein said distal end surface and each said third contact surface are substantially flat.

5. An assembly according to claim 3 wherein the spacing between surfaces of the teeth of said toothed surfaces on said cutter head and said distal end surface is selected such that each said bit holder is pretensioned when fixedly attached to said head by said means for clampling.

6. An assembly to claim 3 wherein said third contact surface lies between said linear tooth system on said bit holder and said first contact surface, said third contact surface being spaced from said distal end surface so as to contact said distal end surface before inelastic deformation of said bit holder occurs.

* * * * *